United States Patent
Omiya et al.

(10) Patent No.: US 9,962,652 B2
(45) Date of Patent: May 8, 2018

(54) HONEYCOMB TYPE HEATING DEVICE AND METHOD OF USING THE SAME

(71) Applicant: NGK INSULATORS, LTD., Nagoya (JP)

(72) Inventors: Yoshimasa Omiya, Nagoya (JP); Yoshiyuki Kasai, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days. days.

(21) Appl. No.: 15/016,675

(22) Filed: Feb. 5, 2016

(65) Prior Publication Data
US 2016/0243500 A1   Aug. 25, 2016

(30) Foreign Application Priority Data

Feb. 20, 2015 (JP) .................. 2015-031924

(51) Int. Cl.
| F01N 3/26 | (2006.01) |
| B01D 53/94 | (2006.01) |
| F01N 3/20 | (2006.01) |
| F01N 3/28 | (2006.01) |
| F01N 3/022 | (2006.01) |

(52) U.S. Cl.
CPC .......... B01D 53/94 (2013.01); F01N 3/0222 (2013.01); F01N 3/2013 (2013.01); F01N 3/2828 (2013.01); *F01N 2240/16* (2013.01); *F01N 2330/06* (2013.01); *Y02T 10/26* (2013.01)

(58) Field of Classification Search
CPC ..... F01N 3/0222; F01N 2240/16; Y02T 10/26
USPC ............................. 422/174, 179, 180; 55/523
See application file for complete search history.

(56) References Cited

U.S. PATENT DOCUMENTS

| 2004/0166035 A1* | 8/2004 | Noda ..................... B01D 53/94 422/180 |
| 2009/0136710 A1* | 5/2009 | Ichikawa ........... B01D 46/2451 428/117 |
| 2009/0155527 A1* | 6/2009 | Kawai ................... C04B 35/565 428/116 |

(Continued)

FOREIGN PATENT DOCUMENTS

| DE | 196 46 025 A1 | 5/1998 |
| DE | 10 2004 046 918 A1 | 3/2006 |

(Continued)

OTHER PUBLICATIONS

Extended European Search Report (Application No. 16156251.7) dated Jun. 28, 2016.

*Primary Examiner* — Tom P Duong
(74) *Attorney, Agent, or Firm* — Burr & Brown, PLLC

(57) ABSTRACT

The honeycomb type heating device includes: a pillar-shaped honeycomb substrate which includes a porous partition wall defining a plurality of cells extending from one end face to the other end face and a circumferential wall surrounding the partition wall; and a plurality of heaters which are disposed adjacently in a circumferential direction of an outer circumferential face that is an outer surface of the circumferential wall, on the outer circumferential face. Each heater is a resistance heating heater which radiates heat by a current supplied thereto, each heater comes into face-contact with the outer circumferential face, and a ratio of a total area of a portion covered by the heaters of the outer circumferential face with respect to the entire area of the outer circumferential face is 50 to 100%.

14 Claims, 5 Drawing Sheets

(56) References Cited

U.S. PATENT DOCUMENTS

| | | | |
|---|---|---|---|
| 2009/0239031 A1* | 9/2009 | Ichikawa | B01D 46/2429 428/116 |
| 2009/0280292 A1* | 11/2009 | Mizutani | B01D 46/2429 428/117 |
| 2012/0076698 A1* | 3/2012 | Ishihara | B01D 53/00 422/174 |
| 2012/0282562 A1* | 11/2012 | Narumi | C04B 35/478 432/9 |
| 2013/0045137 A1* | 2/2013 | Sakashita | B01J 35/04 422/174 |
| 2014/0290227 A1 | 10/2014 | Sugiura et al. | |
| 2014/0291315 A1 | 10/2014 | Mase et al. | |

FOREIGN PATENT DOCUMENTS

| | | | |
|---|---|---|---|
| EP | 1604724 A2 * | 12/2005 | ......... B01D 39/2068 |
| EP | 2 784 051 A2 | 10/2014 | |
| EP | 2 784 284 A2 | 10/2014 | |
| JP | 2010-229976 A1 | 10/2010 | |
| JP | 2013-238116 A1 | 11/2013 | |

* cited by examiner

HONEYCOMB TYPE HEATING DEVICE AND METHOD OF USING THE SAME

The present application is an application based on JP 2015-031924 filed on Feb. 20, 2015 with the Japan Patent Office, the entire contents of which are incorporated herein by reference.

BACKGROUND OF THE INVENTION

Field of the Invention

The present invention relates to a honeycomb type heating device which is installed in an exhaust gas emitting path for an exhaust gas emitted from an engine of an automobile or the like and increases a temperature of an exhaust gas purifying catalyst to a catalyst activating temperature at an early timing and relates to a method of using the same.

Description of the Related Art

Hitherto, a honeycomb structure having a catalyst loaded thereon is used in order to purify a toxic material such as HC, CO, and $NO_x$ contained in an exhaust gas emitted from an engine of an automobile or the like. In this way, when the exhaust gas is treated by the catalyst loaded on the honeycomb structure, the temperature of the catalyst needs to be increased to the catalyst activating temperature. However, since the temperature of the catalyst does not reach the catalyst activating temperature at the start-up of the engine, a problem arises in that the exhaust gas is not sufficiently purified. Particularly, since a plug-in hybrid vehicle (PHEV) or a hybrid vehicle (HV) uses only a motor in a travel mode, the engine is not frequently started, and the temperature of the catalyst is low during the start-up of the engine. For this reason, the exhaust gas purifying performance is easily degraded immediately after the start-up of the engine.

In order to solve this problem, there is proposed an electric heating catalyst (EHC) in which a temperature of a catalyst is increased to a catalyst activating temperature before the start-up of an engine while an electrode is disposed in a honeycomb structure formed of conductive ceramics and a current is supplied to the honeycomb structure so that heat is radiated from the honeycomb structure (see Patent Document 1).

Further, there is also proposed a heating device in which a tubular resistance heating heater is disposed so as to surround a circumferential wall of a honeycomb structure and a wall surface of the circumferential wall of the honeycomb structure is heated so as to transfer heat to an inner cell structure (see Patent Document 2).

[Patent Document 1] JP-A-2010-229976
[Patent Document 2] JP-A-2013-238116

SUMMARY OF THE INVENTION

However, in a method of radiating heat from the honeycomb structure by supplying a current thereto, the path of the current flowing through the honeycomb structure changes only by a slight crack generated in the honeycomb structure due to a vibration or the like, and hence the temperature is degraded or the temperature distribution is changed. For this reason, sufficient durability is not guaranteed.

Meanwhile, in a method in which the tubular resistance heating heater is disposed so as to surround the circumferential wall of the honeycomb structure, the honeycomb structure is heated by an external heater. Accordingly, even when a slight crack is generated in the honeycomb structure by a vibration or the like, the temperature of the honeycomb structure is not greatly changed. However, the tubular heater is easily broken by thermal stress. Then, in a heating method of using a single (integrated) resistance heating heater, the entire honeycomb structure is not heated at all when the heater is broken and cannot supply a current. Further, in order to highly efficiently transfer heat generated from the heater to the honeycomb structure, it is preferable that an inner circumferential face of the tubular resistance heating heater come into face-contact with an outer circumferential face of the honeycomb structure in a wide range. However, an extremely high shape precision is demanded for this configuration, and hence the production thereof becomes too difficult. Particularly when an outer circumferential face is a curved face like a round pillar-shaped honeycomb structure, it is difficult to cause the curved face to come into face-contact with the inner circumferential face of the tubular resistance heating heater in a wide range in accordance with an increase in diameter of the honeycomb structure.

The invention is made in view of such circumstances of the related art, and an object of the invention is to provide a honeycomb type heating device capable of causing a honeycomb structure (a substrate) to come into face-contact with a heater in a wide range and of heating a target even when a part of the heater is broken and to provide a method of using the same.

In order to attain the above-described object, according to the invention, a honeycomb type heating device and a method of using the same below are provided.

According to a first aspect of the present invention, a honeycomb type heating device is provided including: a pillar-shaped honeycomb substrate which includes a porous partition wall defining a plurality of cells extending from one end face to the other end face and a circumferential wall surrounding the partition wall; and a plurality of heaters which are disposed adjacently in a circumferential direction of an outer circumferential face that is an outer surface of the circumferential wall, on the outer circumferential face, wherein each heater is a resistance heating heater which radiates heat by a current supplied thereto, each heater comes into face-contact with the outer circumferential face, and a ratio of a total area of a portion covered by the heaters of the outer circumferential face with respect to the entire area of the outer circumferential face is 50 to 100%.

According to a second aspect of the present invention, the honeycomb type heating device according to the first aspect is provided, wherein the honeycomb substrate is formed of a ceramic material having thermal conductivity of 20 W/m·K or more.

According to a third aspect of the present invention, the honeycomb type heating device according to the first or second aspects is provided, wherein the plurality of heaters are electrically connected in series or in parallel and have electric resistances which withstand application of a high voltage of 200 V or more.

According to a fourth aspect of the present invention, the honeycomb type heating device according to any one of the first to third aspects is provided, wherein each heater has an insulating function of preventing a current from flowing from each heater to the honeycomb substrate.

According to a fifth aspect of the present invention, the honeycomb type heating device according to any one of the first to fourth aspects is provided, wherein a center angle of each heater disposed on the outer circumferential face of the honeycomb substrate is 180° or less in a cross-section perpendicular to the longitudinal direction of the honeycomb substrate.

According to a sixth aspect of the present invention, the honeycomb type heating device according to any one of the first to fifth aspects is provided, wherein the thickness of the circumferential wall is larger than that of the partition wall.

According to a seventh aspect of the present invention, the honeycomb type heating device according to any one of the first to sixth aspects is provided, wherein the honeycomb substrate is provided with a stress relief.

According to an eighth aspect of the present invention, the honeycomb type heating device according to any one of the first to seventh aspects is provided, wherein a buffer material is disposed on a face of each heater contacting the outer circumferential face.

According to a ninth aspect of the present invention, the honeycomb type heating device according to any one of the first to eighth aspects is provided, further including: a tubular canning case, wherein the honeycomb substrate is accommodated inside the canning case.

According to a tenth aspect of the present invention, the honeycomb type heating device according to the ninth aspect is provided, wherein a retainer ring is disposed inside the canning case so as to be close to both end faces of the honeycomb substrate and the retainer ring prevents a fluid from flowing into a space defined by the canning case, the honeycomb substrate, and the retainer ring.

According to an eleventh aspect of the present invention, the honeycomb type heating device according to the ninth or tenth aspects is provided, wherein a heat insulating material is disposed between each heater and the canning case.

According to a twelfth aspect of the present invention, the honeycomb type heating device according to any one of the first to eleventh aspects is provided, wherein an exhaust gas purifying catalyst is loaded on the honeycomb substrate.

According to the thirteenth aspect of the present invention, the honeycomb type heating device according to the twelfth aspect is provided, wherein the honeycomb type heating device is installed in an exhaust gas emitting path for an exhaust gas emitted from an engine, and used so that a current begins being supplied to each heater before start-up of the engine to heat each heater and increase a temperature of the honeycomb substrate loading exhaust gas purifying catalyst thereon to a temperature equal to or more than a catalyst activating temperature of the catalyst.

According to a fourteenth aspect of the present invention, a method of using a honeycomb type heating device including a pillar-shaped honeycomb substrate which includes a porous partition wall defining a plurality of cells extending from one end face to the other end face and a circumferential wall surrounding the partition wall is provided; and a plurality of heaters which are disposed adjacently in a circumferential direction of an outer circumferential face that is an outer surface of the circumferential wall, on the outer circumferential face, wherein each heater is a resistance heating heater which radiates heat by a current supplied thereto, each heater comes into face-contact with the outer circumferential face, and a ratio of a total area of a portion covered by the heaters of the outer circumferential face with respect to the entire area of the outer circumferential face is 50 to 100%, including installing the honeycomb type heating device having an exhaust gas purifying catalyst loaded on a honeycomb substrate in an exhaust gas emitting path for an exhaust gas emitted from an engine, and beginning supplying a current to each heater before start-up of the engine to heat each heater and increase a temperature of the honeycomb substrate loading exhaust gas purifying catalyst thereon to a temperature equal to or more than a catalyst activating temperature of the catalyst.

In the honeycomb type heating device of the invention, heat is not radiated from the honeycomb substrate and the honeycomb substrate is heated by the heater attached thereto. For this reason, even when a slight crack is generated in the honeycomb substrate, the temperature of the honeycomb substrate is not changed greatly. Further, since the honeycomb substrate is heated by the plurality of heaters, even when a part of the heaters are broken and cannot supply a current, the honeycomb substrate can be heated by the other heaters which can supply currents. The plurality of heaters are disposed adjacently in the circumferential direction of the outer circumferential face of the honeycomb substrate, but form a split structure in which the plurality of heaters are separated from each other. Thus, large thermal stress is hardly generated in each heater and hence the heater is not easily broken. Further, due to the split structure in which the plurality of heaters are separated from each other, each heater can easily come into face-contact with the outer circumferential face of the honeycomb substrate, and the heater can come into face-contact with the outer circumferential face of the honeycomb substrate in a wide range. As a result, the heat of the heater can be highly efficiently transferred to the honeycomb substrate and hence the honeycomb type heating device has an excellent temperature increase characteristic.

Further, according to the method of using the honeycomb type heating device of the invention, a current starts to be supplied to each heater before the start-up of the engine so that heat is radiated from each heater and hence the temperature of the honeycomb substrate having the exhaust gas purifying catalyst loaded thereon can be increased to the catalyst activating temperature or more. As a result, it is possible to highly efficiently purify a toxic element contained in an exhaust gas by the catalyst activated immediately after the start-up of the engine.

DETAILED DESCRIPTION OF THE INVENTION

Hereinafter, the invention will be described based on detailed embodiments, but the invention is not limited to the embodiments. The design can be appropriately modified and improved based on the general knowledge of the person skilled in the art without departing from the spirit of the invention.

Figure 1:
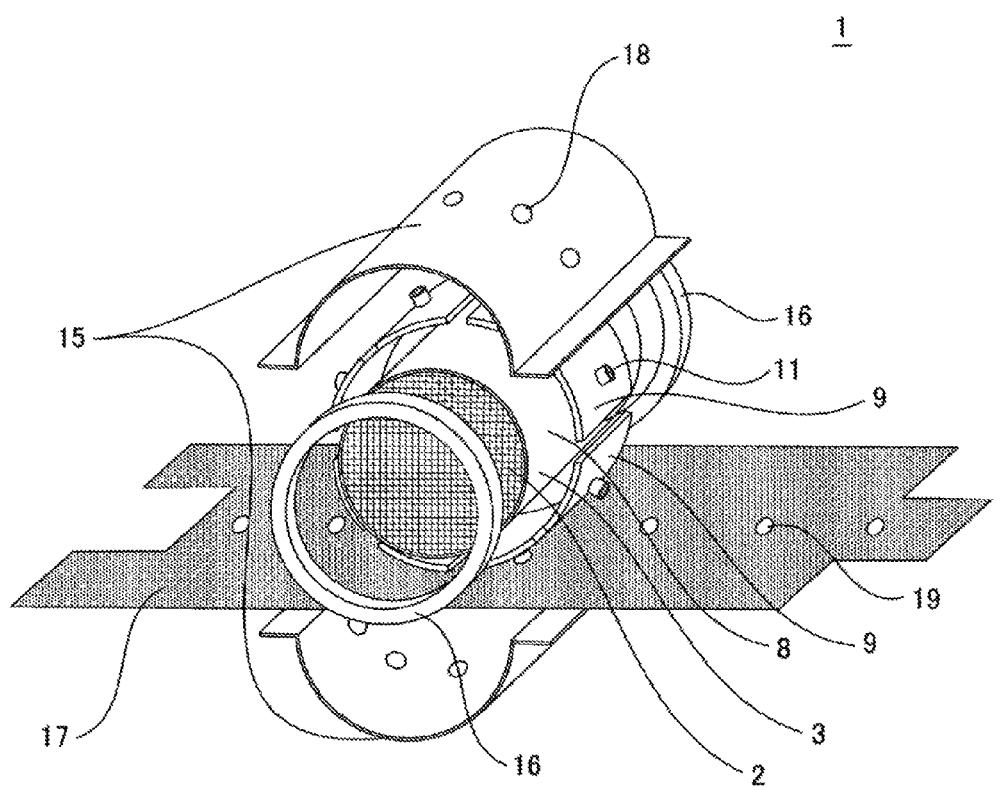
FIG. 1 is a schematic exploded view showing an example of a honeycomb type heating device according to an embodiment of the invention.
Figure 2:
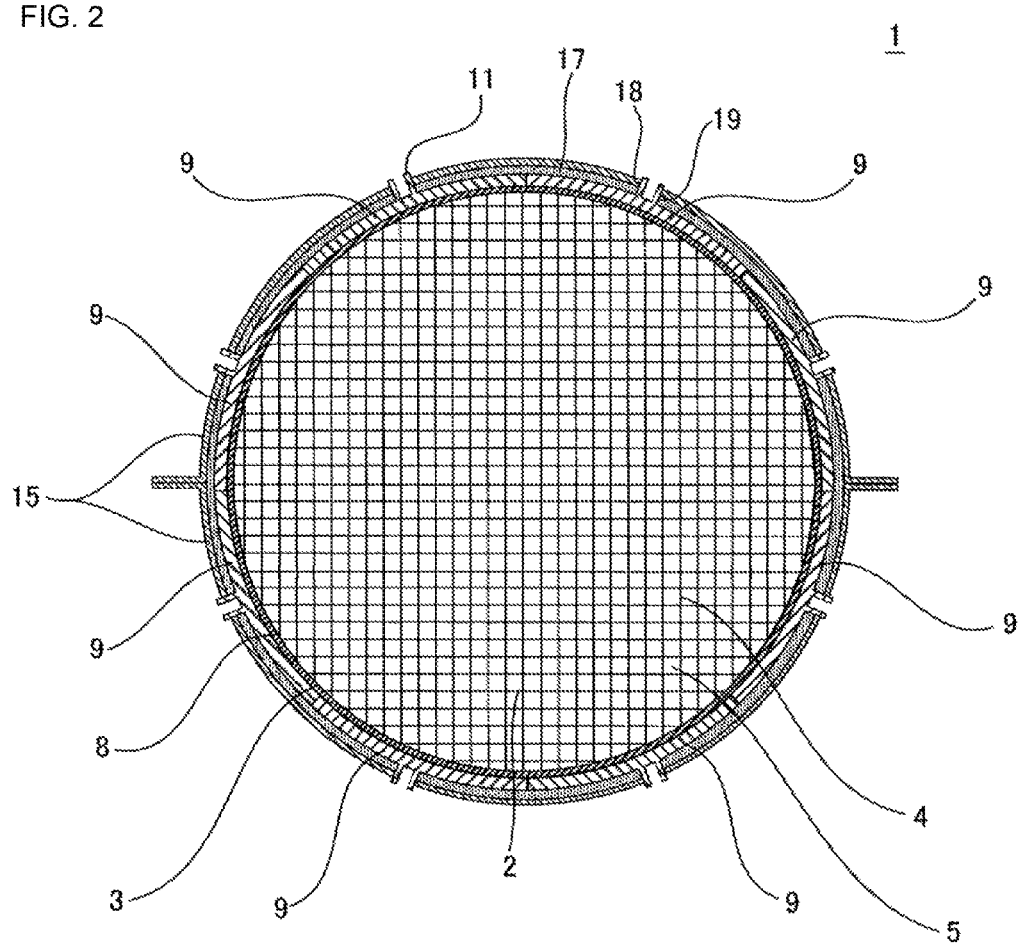
FIG. 2 is a schematic cross-sectional view showing an example of the honeycomb type heating device according to the embodiment of the invention when viewed from a cross-section perpendicular to the longitudinal direction (the axial direction) of the device.
Figure 3:
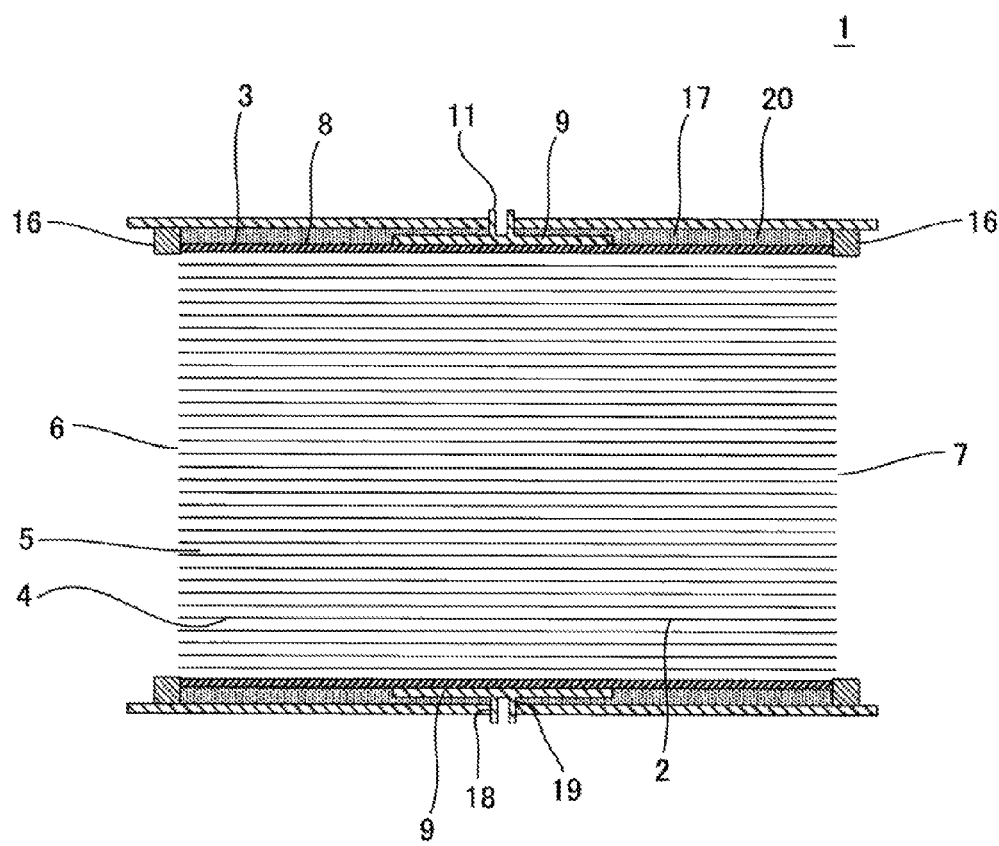
FIG. 3 is a schematic cross-sectional view showing an example of the honeycomb type heating device according to the embodiment of the invention when viewed from a cross-section parallel to the longitudinal direction (the axial direction) of the device.

(1) Honeycomb Type Heating Device:

FIG. 1 is a schematic exploded view showing an example of a honeycomb type heating device according to an embodiment of the invention. Further, FIG. 2 is a schematic cross-sectional view showing an example of the honeycomb type heating device according to the embodiment of the invention when viewed from a cross-section perpendicular to the longitudinal direction (the axial direction) of the device, and FIG. 3 is a schematic cross-sectional view showing an example of the honeycomb type heating device according to the embodiment of the invention when viewed from a cross-section parallel to the longitudinal direction (the axial direction) of the device. As shown in FIGS. 1 to 3, the honeycomb type heating device 1 of the invention includes a honeycomb substrate 2 and a plurality of heaters 9.

The honeycomb substrate 2 has a pillar shape and includes a porous partition wall 4 which defines a plurality of cells 5 extending from one end face 6 to the other end face 7 and a circumferential wall 3 which surrounds the partition wall 4. The cells 5 are formed as flow channels of a fluid such as an exhaust gas. The plurality of heaters 9 are adjacently disposed on an outer circumferential face 8 in the circumferential direction of the outer circumferential face 8 as an outer face (a face exposed to the outside) of the circumferential wall 3 of the honeycomb substrate 2. Each heater 9 is a resistance heating heater that radiates heat by a current supplied thereto. In the embodiment, each heater 9 is provided with an electrode terminal protrusion 11 to be connected to an electric wiring. The electrode terminal protrusion 11 is formed in a tubular shape and the electrode terminal of the heater 9 is disposed therein. Then, a current is supplied from a power supply to each heater 9 through the electric wiring connected to the electrode terminal.

In the honeycomb type heating device 1 of the invention, each heater 9 is disposed on the outer circumferential face 8 of the honeycomb substrate 2 so as to come into face-contact with the outer circumferential face 8. Furthermore, as will be described later, the "face-contact" of the invention also includes a contact with an insulating material or a buffer material interposed therebetween when the insulating material or the buffer material is disposed on the face of each heater contacting the outer circumferential face of the honeycomb substrate.

In the honeycomb type heating device 1 of the invention, a ratio (hereinafter, referred to as a "heater installation area ratio") of a total area of a portion covered by each heater 9 in the outer circumferential face 8 with respect to the entire area of the outer circumferential face 8 of the honeycomb substrate 2 is 50 to 100%. Since the honeycomb type heating device 1 of the invention is formed so that the heater installation area ratio is set in such a range, the heater 9 can come into face-contact with the outer circumferential face of the honeycomb substrate 2 in a wide range, and hence the heat of the heater 9 can be transferred to the honeycomb substrate 2 with high efficiency. Furthermore, it is preferable that the heater installation area ratio be from 50 to 85%. In this way, when the upper limit of the heater installation area ratio is set to 85%, an appropriate gap can be formed between the adjacent heaters 9 in the circumferential direction of the outer circumferential face 8 of the honeycomb substrate 2, and hence the short-circuit caused by the contact between the heaters 9 can be easily prevented. Further, since a structure for preventing the positional deviation of the heater 9 can be formed between the adjacent heaters 9 of the outer circumferential face 8, the positional deviation of the heater 9 caused by a vibration and the like can be effectively prevented by the structure.

As described above, in the single tubular heater disclosed in Patent Document 2, it is extremely difficult to realize a structure in which the inner circumferential face of the heater comes into face-contact with the outer circumferential face of the honeycomb structure in a wide range from the viewpoint of shape precision. For this reason, in the invention disclosed in Patent Document 2, in order to cause the heater to come into face-contact with the honeycomb structure in a wide range, there is a need to prepare, for example, a countermeasure in which a thick buffer material is disposed on the inner circumferential face of the heater and a gap between the inner circumferential face of the heater and the outer circumferential face of the honeycomb structure is decreased. However, such a thick buffer material disturbs the transfer of heat from the heater to the honeycomb structure and hence the heat transfer efficiency is degraded.

Figure 4:
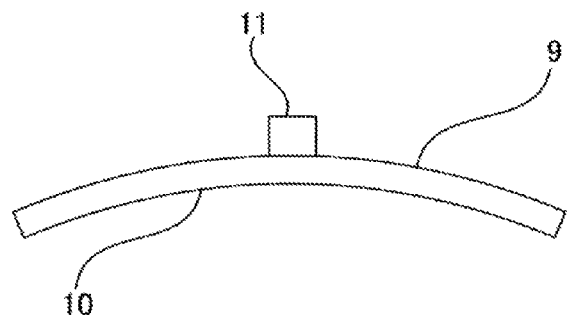
FIG. 4 is a schematic side view showing an example of a heater used in the honeycomb type heating device of the invention.

Therefore, in the honeycomb type heating device 1 of the invention, the plurality of heaters 9 are used as means for causing the heater and the honeycomb structure to come into face-contact with each other in a wide range and are adjacently disposed on the outer circumferential face 8 in the circumferential direction of the outer circumferential face 8 of the honeycomb substrate 2. The whole of the plurality of heaters 9 has a tubular shape (an annular shape), but each heater 9 has a shape obtained by dividing a cylinder in the radial direction. High shape precision is not needed in order to cause the heater to come into face-contact with the outer circumferential face 8 of the honeycomb substrate 2 in a wide range. For example, in order to cause the heater 9 shown in FIG. 4 to come into face-contact with the outer circumferential face of the round pillar-shaped honeycomb substrate 2 in a wide range, a concave circular-arc face 10 which is curved as much as the outer circumferential face of the honeycomb substrate 2 is formed, but such a face can be comparatively easily formed.

Further, in the honeycomb type heating device 1 of the invention, the honeycomb substrate 2 is heated by the plurality of heaters 9. For this reason, even when a part of the heaters 9 are broken and cannot supply a current, the honeycomb substrate 2 can be heated by the other heaters 9 which can supply currents. Furthermore, in the honeycomb type heating device 1 of the invention, heat is not radiated from the honeycomb substrate 2, but the honeycomb substrate 2 is heated by the heater 9 attached thereto. For this reason, even when a slight crack is generated in the honeycomb substrate 2, the temperature of the honeycomb substrate 2 does not change greatly.

Further, the plurality of heaters 9 used in the honeycomb type heating device 1 of the invention are adjacent to each other in the circumferential direction of the outer circumferential face 8 of the honeycomb substrate 2, but form a split structure in which the plurality of heaters 9 are separated from each other. Thus, large thermal stress is hardly generated in each heater 9. For this reason, the plurality of heaters 9 have a feature that a damage caused by thermal stress hardly occurs and durability is excellent compared to the single tubular heater disclosed in Patent Document 2.

The number of the heaters 9 used in the honeycomb type heating device 1 of the invention is not limited as long as a plurality of heaters is provided. However, it is preferable to use two to eight heaters in consideration of how a face coming into face-contact with the outer circumferential face 8 of the honeycomb substrate 2 in a wide range is easily formed or the device is easily assembled. Furthermore, as long as the heater installation area ratio is 50 to 100%, the area of a part in which each heater 9 covers the outer circumferential face 8 of the honeycomb substrate 2 is not limited. Further, as long as the heater installation area ratio is 50 to 100%, the length of each heater 9 in the longitudinal direction (the axial direction) of the honeycomb substrate 2 is not limited. For example, the end of each heater 9 in the longitudinal direction (the axial direction) of the honeycomb substrate 2 may or may not reach the end of the honeycomb substrate 2.

Further, it is preferable that the honeycomb type heating device 1 of the invention have a part in which 50% or more of the outer circumferential face 8 is covered by the heater 9 in the circumferential direction of the honeycomb substrate 2. Further, in the honeycomb type heating device 1 of the invention, it is preferable that the "part in which 50% or more of the outer circumferential face 8 is covered by the heater 9 in the circumferential direction of the honeycomb substrate 2" exist in the length of 60% or more of the entire length of the honeycomb substrate 2 in the axial direction of the honeycomb substrate 2. Since an area covered by the heater 9 in the outer circumferential face 8 of the honeycomb substrate 2 is set in this way, the honeycomb substrate 2 can be easily heated to a target temperature.

Generally, when the honeycomb type heating device 1 of the invention is used while being mounted on an automobile, a power supply used in an electrical system of the automobile is commonly used to supply a current to the heater 9. For example, a power supply with a high voltage of 200 V is used. For this reason, in the honeycomb type heating device 1 of the invention, the plurality of heaters 9 are electrically connected in series or in parallel to one another. Thus, it is preferable for the plurality of heaters 9 to have electric resistances which withstand application of a high voltage of 200 V or more. Here, "electric resistances which withstand application of a high voltage of 200 V or more" specifically indicates electric resistances which induce about 25 A when a voltage of 200 V is applied.

Furthermore, since a metallic heater has a low electric resistance, there is a case in which a power supply circuit is damaged by an excessive current when such a high-voltage power supply is used. Thus, it is preferable to use a ceramic heater in which a heating resistor is buried inside a ceramic member in the honeycomb type heating device 1 of the invention. As a material forming the ceramic member, beryllia, aluminum nitride, silicon nitride, alumina, or the like can be appropriately used. Further, as a material forming the heating resistor, silver (Ag), aluminum (Al), gold (Au), beryllium (Be), copper (Cu), magnesium (Mg), molybdenum (Mo), tungsten (W), ruthenium (Ru), platinum (Pt), or the like can be appropriately used. Further, the material forming the heating resistor may be a compound and in this case, nitrides, carbides, borides, and silicides of zirconium (Zr), titanium (Ti), niobium (Nb), hafnium (Hf), tantalum (Ta), molybdenum (Mo), and tungsten (W) can be appropriately used.

Figure 5:
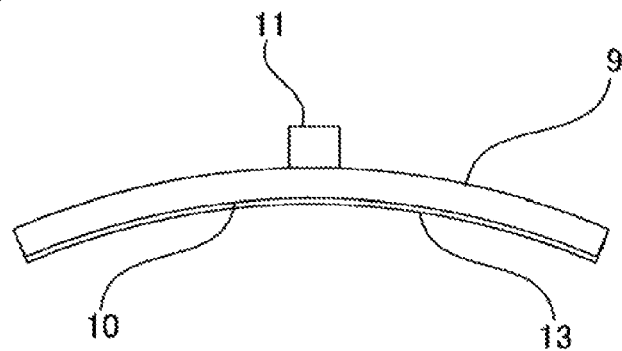
FIG. 5 is a schematic side view showing another example of the heater used in the honeycomb type heating device of the invention.

When the honeycomb substrate 2 used in the honeycomb type heating device 1 of the invention is formed of a conductive material, it is preferable that each heater 9 have an insulating function of preventing a current from flowing from each heater 9 to the honeycomb substrate 2. When each heater 9 has the insulating function, it is possible to prevent a short-circuit caused by the current flowing from each heater 9 to the honeycomb substrate even when the honeycomb substrate 2 is formed of the conductive material. As an example of a method of giving the insulating function to each heater 9, for example, as shown in FIG. 5, a method of disposing an insulating material 13 on a face 10 contacting the outer circumferential face of the honeycomb substrate in each heater 9 can be exemplified. As a material of the insulating material 13, silicon nitride, alumina, or the like can be appropriately used.

Figure 6:
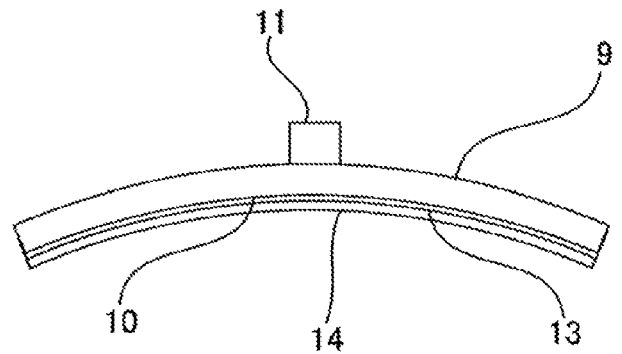
FIG. 6 is a schematic side view showing still another example of the heater used in the honeycomb type heating device of the invention.

Further, as shown in FIG. 6, it is preferable to dispose a buffer material 14 on the face 10 (a front face of the insulating material 13 in the case that the insulating material 13 is disposed on the face 10) contacting the outer circumferential face 8 of the honeycomb substrate 2 in each heater 9. When the buffer material 14 is disposed in this way, it is possible to effectively prevent a breakage caused by a vibration or a contact between the heater 9 and the outer circumferential face 8 of the honeycomb substrate 2. As a material of the buffer material 14, for example, graphite having high thermal conductivity is preferable. The thickness of the buffer material 14 is preferably from 0.05 to 2.0 mm and more preferably from 0.05 to 1.5 mm. When the thickness of the buffer material 14 is smaller than 0.05 mm, there is a case in which an effect of preventing a breakage caused by a vibration or a contact between the heater 9 and the outer circumferential face 8 of the honeycomb substrate 2 is not sufficiently exhibited. Further, when the thickness of the buffer material 14 exceeds 2.0 mm, there is a case in which the heat of the heater is not easily transferred to the honeycomb substrate with high efficiency.

Figure 8:
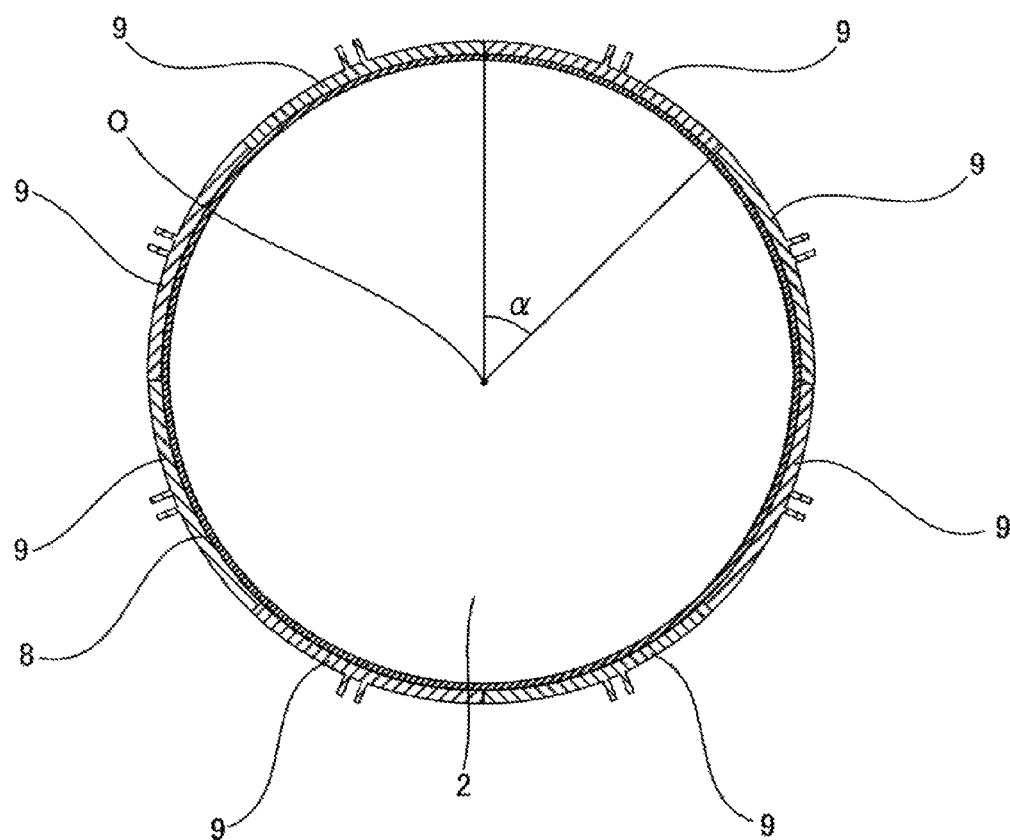
FIG. 8 is a schematic cross-sectional view illustrating a center angle of the heater.

In the honeycomb type heating device 1 of the invention, it is preferable that the center angle α of each heater 9 disposed on the outer circumferential face 8 of the honeycomb substrate 2 be equal to or smaller than 180° in the cross-section perpendicular to the longitudinal direction (the axial direction) of the honeycomb substrate 2. Further, the center angle α is more preferably 10 to 180° and is further preferably 10 to 100°. Here, as shown in FIG. 8, the "center angle α of each heater 9" indicates a corner formed by two lines connecting both ends of each heater 9 and the center O of the honeycomb substrate 2 in the cross-section perpendicular to the longitudinal direction of the honeycomb substrate 2. Further, as shown in FIG. 8, the "center O of the honeycomb substrate 2" indicates the center of the circle when the outer circumferential shape of the cross-section perpendicular to the longitudinal direction of the honeycomb substrate 2 is circular. Further, when the outer circumferential shape of the cross-section perpendicular to the longitudinal direction of the honeycomb substrate 2 is formed in a shape other than the circular shape, the center indicates the center of the maximum circle included in the cross-section. When the center angle α of each heater 9 exceeds 180°, there is a case in which the honeycomb substrate 2 and the heater 9 cannot come into face-contact with each other in a wide range. Further, when the center angle α of each heater 9 is smaller than 10°, the range of the outer circumferential face 8 covered by one heater 9 is narrowed, and hence the number of the heaters 9 necessary to heat the honeycomb substrate 2 to the target temperature increases excessively. Furthermore, in FIG. 8, the partition wall of the honeycomb substrate 2 is omitted.

It is preferable to form the honeycomb substrate 2 used in the honeycomb type heating device 1 of the invention by a ceramic material having thermal conductivity of 20 W/m·K or more. Here, it is more preferable to use a ceramic material having thermal conductivity of 50 W/m·K or more. When the honeycomb substrate 2 is formed of such a material having high thermal conductivity, the heat of the heater 9 can be transferred to the honeycomb substrate 2 with high efficiency and heat can be uniformly radiated from the entire honeycomb substrate 2.

As a material forming the honeycomb substrate 2, a material mainly containing SiC (silicon carbide) having excellent thermal conductivity, heat resistance, and corrosion resistance is preferable. Furthermore, the "main element" mentioned herein indicates an element of 50 mass % or more of the entire material. As a more detailed material, Si—SiC composite, (Si+Al)—SiC composite, metal composite SiC, recrystallization SiC, $Si_3N_4$, SiC, and the like are exemplified as preferred materials. Here, when the porosity of the honeycomb substrate 2 is too high, high thermal conductivity cannot be obtained even when such a material is used. Thus, it is preferable to form the honeycomb substrate 2 by a dense material (having porosity of 20% or less). Since Si—SiC composite is densely formed by impregnating metal Si into SiC, thermal conductivity or heat resistance is high. For this reason, these examples are preferable as the material forming the honeycomb substrate 2.

It is preferable that the thickness of the circumferential wall 3 of the honeycomb substrate 2 be larger than that of the partition wall 4. In this way, when the thickness of the circumferential wall 3 is larger than that of the partition wall 4, the strength of the honeycomb substrate 2 can be increased and hence the strength necessary for the honeycomb substrate 2 can be easily ensured.

The thickness of the circumferential wall 3 of the honeycomb substrate 2 is not particularly preferable. However, the thickness of 0.15 to 2.0 mm is more preferable and the thickness of 0.3 to 1.0 mm is further preferable. When the thickness of the circumferential wall 3 is set to 0.15 mm or more, the mechanical strength of the honeycomb substrate 2 becomes sufficient. Thus, the breakage of the honeycomb substrate 2 caused by the impact or the thermal stress can be prevented. Further, when the thickness of the circumferential wall 3 is set to 2.0 mm or less, the heat of the heater 9 can be transferred to the partition wall 4 through the circumferential wall 3 with high efficiency.

The thickness of the partition wall 4 of the honeycomb substrate 2 is also not particularly limited. However, the thickness of 0.1 to 1 mm is preferable and the thickness of 0.2 to 0.5 mm is more preferable. When the thickness of the partition wall 4 is set to 0.1 mm or more, the mechanical strength of the honeycomb substrate 2 becomes sufficient. Thus, the breakage of the honeycomb substrate 2 caused by the impact or the thermal stress can be prevented. Further, when the thickness of the partition wall 4 is set to be equal to or smaller than 1 mm, it is possible to prevent an increase in pressure loss when a fluid flows through the cell 5.

The cell density (the number of the cells per unit cross-sectional area) of the honeycomb substrate 2 is not particularly limited, but the range of 25 to 2000 cells/square inch (4 to 320 cells/$cm^2$) is preferable. When the cell density is set to 25 cells/square inch (4 cells/$cm^2$) or more, the strength of the partition wall 4 and the strength and the effective GSA (the geometric surface area) of the honeycomb substrate 2 are sufficient. Further, when the cell density is set to be equal to or smaller than 2000 cells/square inch (320 cells/$cm^2$), it is possible to prevent an increase in pressure loss when a fluid flows through the cell 5.

The porosity of the honeycomb substrate 2 is preferably 20% or less and more preferably 10% or less. When the porosity of the honeycomb substrate 2 is set to such a range, the strength necessary for the honeycomb substrate 2 can be easily ensured and the thermal conductivity can be improved. Furthermore, the "porosity" mentioned herein is a value measured by Archimedes' principle.

The shape (the outer shape) of the honeycomb substrate 2 is not particularly limited other than a pillar shape. For example, the honeycomb substrate 2 can be formed in a round pillar shape, an oval pillar shape, or a polygonal pillar shape. Furthermore, it is preferable to form the honeycomb substrate in a round pillar shape or an oval pillar shape so that the outer circumferential face is curved from the viewpoint that the effect obtained from the split structure having the plurality of separate heaters (the effect that the heater can easily come into face-contact with the outer circumferential face of the honeycomb substrate in a wide range) is easily exhibited. Further, the shape (hereinafter, referred to as a "cell shape") of the cross-section perpendicular to the longitudinal direction of the honeycomb substrate 2 in the cell 5 is not particularly limited. However, a polygonal shape such as a square, a hexagon, and an oxtagon or a combination thereof is preferable. For example, a combination of a square or an octagon is preferable.

The diameter of the cross-section perpendicular to the longitudinal direction of the honeycomb substrate 2 (the diameter of the circle circumscribing the cross-section when the cross-section has a shape other than a circular shape) is not particularly limited. However, 300 mm or less is preferable and 200 mm or less is more preferable. When the diameter of the cross-section perpendicular to the longitudinal direction of the honeycomb substrate 2 is set to such a range, the heat of the heater 9 can be transferred to the partition wall 4 inside the honeycomb substrate 2 with high efficiency.

Figure 7:
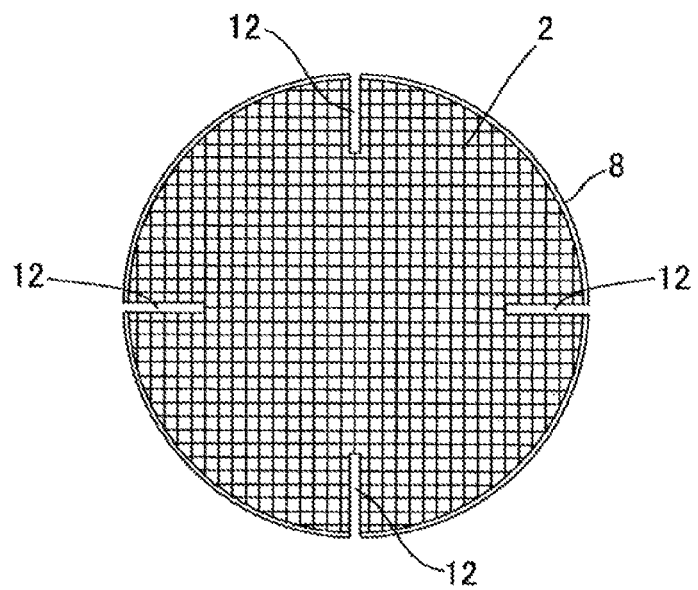
FIG. 7 is a schematic top view showing an example of a honeycomb substrate having a stress relief formed therein.

It is preferable to form a stress relief in the honeycomb substrate 2. When the stress relief is formed, the stress inside the honeycomb substrate 2 can be alleviated. As a representative example of the stress relief, for example, as shown in FIG. 7, a slit 12 which is notched inward from the outer circumferential face 8 of the honeycomb substrate 2 can be exemplified. However, the stress relief is not limited to the slit 12, and an existing stress relief can be formed without departing from the spirit of the invention.

When the honeycomb type heating device 1 of the invention is used while being installed in an exhaust gas emitting path for an exhaust gas from an engine, it is preferable to load an exhaust gas purifying catalyst in the partition wall 4 of the honeycomb substrate 2. When the catalyst is loaded on the partition wall 4 in this way, a toxic material such as CO, $NO_R$, and HC in the exhaust gas can be changed into a non-toxic material by a catalyst reaction. Here, the type of the catalyst loaded on the partition wall 4 of the honeycomb substrate 2 is not particularly limited. However, for example, when the honeycomb type heating device 1 is used for purification of an exhaust gas of an automobile, noble metal is preferably used. As noble metal, platinum, rhodium, or palladium or a combination thereof is preferable. It is preferable that the noble metal loading amount be 0.1 to 5 g/L per unit volume of the honeycomb substrate 2.

In order to load a catalyst such as noble metal on the partition wall 4 in a highly dispersed state, it is preferable that the catalyst is first loaded on the particle (loading particle) of heat resistant inorganic oxide having a large specific surface area such as alumina, and then is loaded on the partition wall 4 of the honeycomb substrate 2 along with the particle.

As shown in FIG. 1, it is preferable that the honeycomb type heating device 1 of the invention include a tubular canning case 15 and the honeycomb substrate 2 be accommodated inside the canning case 15. The structure of the canning case is not particularly limited, but in the embodiment shown in FIG. 1, the canning case 15 having a clamshell structure is used in order to easily accommodate the honeycomb substrate 2. The canning case 15 having a clamshell structure includes two members each having a semi-circular curved portion, and a tubular shape is formed by the combination of these portions. The canning case 15 is provided with a hole 18 through which the electrode terminal protrusion 11 of the heater 9 protrudes toward the outside of the canning case 15. When the electrode terminal protrusion 11 of the heater 9 protrudes toward the outside of the canning case 15, wire connection of the electric wiring for supplying a current to the heater 9 can be performed at the outside of the canning case 15. Furthermore, in order to insulate the electrode terminal protrusion 11 and the canning case 15, it is preferable to attach a cap-shaped insulating member covering the outer circumferential face to the electrode terminal protrusion 11.

When the honeycomb type heating device 1 of the invention includes the canning case 15, it is preferable to dispose a retainer ring 16 so as to be close to both end faces of the honeycomb substrate 2 inside the canning case 15 as shown in FIG. 3. When the retainer ring 16 is disposed in this way, the positional deviation of the honeycomb substrate 2 caused by a vibration can be prevented. Further, it is possible to prevent a problem in which a fluid flows into a space 20 defined by the canning case 15, the honeycomb substrate 2, and the retainer ring 16 by the use of the retainer ring 16. As a result, when the honeycomb type heating device 1 of the invention is used while being installed in an exhaust gas emitting path for an exhaust gas emitted from an engine, it is possible to prevent the heater 9 from being exposed to the condensed water (steam) contained in the exhaust gas. As a result, the heater is not easily degraded.

Further, when the honeycomb type heating device 1 of the invention includes the canning case 15, it is preferable to dispose the heat insulating material 17 between each heater 9 and the canning case 15 as shown in FIGS. 1 to 3. When the heat insulating material 17 is disposed in this way, the heat of the heater 9 is not easily released to the outside, and hence the heat of the heater 9 can be transferred to the honeycomb substrate 2 with high efficiency. The material of the heat insulating material 17 is not particularly limited. However, it is preferable to use a ceramic fiber mat as the heat insulating material since a ceramic fiber mat can be easily disposed between each heater 9 and the canning case 15 by being wound on the outer circumference of the honeycomb substrate 2 and has a high heat insulating property. When the heat insulating material 17 is wound on the entire outer circumference of the honeycomb substrate 2 including the heater, a hole 19 through which the electrode terminal protrusion 11 of the heater 9 protrudes toward the outside of the canning case 15 is formed also in the heat insulating material 17 as shown in FIGS. 1 to 3.

The application of the honeycomb type heating device 1 of the invention is not particularly limited. However, it is preferable to use the honeycomb type heating device in the exhaust gas emitting path for the exhaust gas emitted from the engine from the viewpoint that the effect produced by the honeycomb type heating device 1 can be effectively used. In that case, it is preferable to use the honeycomb type heating device 1 of the invention so that a current begins being supplied to each heater 9 before the start-up of the engine to heat each heater 9 and increase the temperature of the honeycomb substrate 2 loading the exhaust gas purifying catalyst thereon to a temperature equal to or more than a catalyst activating temperature of the catalyst. When the honeycomb type heating device 1 of the invention is used in this way, it is possible to highly efficiently purify a toxic element contained in the exhaust gas by the activated catalyst immediately after the start-up of the engine.

(2) Honeycomb Type Heating Device Manufacturing Method:

An example of a method of manufacturing the honeycomb type heating device of the invention will be described. First, in order to manufacture a honeycomb substrate, a molding raw material containing a ceramic raw material is made. In the ceramic raw material, powder capable of forming ceramics already exemplified as the material of the honeycomb substrate can be appropriately used. For example, when Si—SiC composite is used as a material forming the honeycomb substrate, SiC powder can be preferably used as the ceramic raw material. It is preferable to prepare the molding raw material by mixing additive such as a dispersing medium, an organic binder, an inorganic binder, and a surfactant with the ceramic raw material if necessary.

Next, the molding raw material is kneaded so as to form pillar-shaped clay. A method of forming clay by kneading the molding raw material is not particularly limited. As a preferred method, for example, a method of using a kneader, a vacuum pugmill, or the like can be exemplified.

Subsequently, a honeycomb formed body including a partition wall and a circumferential wall is extruded from clay by using a die having a lattice-shaped slit and the honeycomb formed body is dried. The drying method is not particularly limited. As a preferred drying method, for example, a hot air drying method, a micro wave drying method, a dielectric drying method, a decompression drying method, a vacuum drying method, a free drying method, and the like can be exemplified. Among these, it is preferable to perform one of the dielectric drying method, the micro wave drying method, and the hot air drying method or a combination thereof.

Subsequently, a honeycomb substrate is made by firing the dried honeycomb formed body (honeycomb dried body). Furthermore, it is preferable to perform calcinating (degreasing) in order to remove a binder contained in the honeycomb formed body before the firing (main firing). The calcinating condition is not particularly limited, and any condition capable of removing (burning) an organic material (an organic binder or the like) contained in the honeycomb formed body may be employed. Since the condition (the temperature, the time, the atmosphere and the like) in which the honeycomb formed body is fired (main fired) is different in accordance with the type of the molding raw material, an appropriate condition may be selected in response to the type. For example, when a honeycomb substrate formed of Si—SiC composite is made, billet-shaped metallic Si is placed on a honeycomb formed body containing SiC powder and is fired at a high temperature in the atmosphere of a depressurized inert gas or in a vacuum state so that metallic Si is impregnated into the honeycomb formed body. Due to the firing, a dense (low-porosity) honeycomb substrate in which metallic Si is charged in a gap of SiC particles can be obtained. Furthermore, a stress relief such as a slit may be formed in the honeycomb substrate if necessary.

Further, when an exhaust gas purifying catalyst is loaded on the partition wall of the honeycomb substrate, a catalyst coated particle is obtained, for example, in such a manner that a solution containing a catalyst element such as noble metal is impregnated into ceramics powder as loading particle in advance and the impregnated powder is dried and fired at a high temperature. Then, a dispersing medium (water or the like) and the other additives are added to the catalyst coated particle obtained in this way so as to prepare a coating solution (slurry). Then, the slurry is coated on the partition wall of the honeycomb substrate by an existing coating method such as a suctioning method and the coated partition wall is dried and fired at a high temperature so that the catalyst is loaded on the partition wall of the honeycomb substrate.

Next, a heater is formed. In order to form the heater, a sintering additive and a binder are appropriately added to ceramic raw materials such as aluminum nitride, silicon nitride, and alumina so as to obtain a molding raw material. A heating resistor is buried in the molding raw material and is subjected to a press molding process so as to obtain, for example, a formed body including a concave circular-arc face curved similarly to the outer circumferential face of the honeycomb substrate and a tubular electrode terminal protrusion provided on a face opposite to the concave circular-arc face. Furthermore, the molding process is performed while adjusting the position so that the end (the electrode terminal) of the heating resistor is exposed into the tubular electrode terminal protrusion. As the heating resistor, a material formed of silver (Ag), aluminum (Al), gold (Au), beryllium (Be), copper (Cu), magnesium (Mg), molybdenum (Mo), tungsten (W), ruthenium (Ru), platinum (Pt), or the like can be appropriately used. Further, the heating resistor may be formed of a compound. In this case, nitrides, carbides, borides, and silicides of zirconium (Zr), titanium (Ti), niobium (Nb), hafnium (Hf), tantalum (Ta), molybdenum (Mo), and tungsten (W) can be appropriately used. The formed body obtained in this way is dried, calcinated, and fired at a high temperature if necessary so as to obtain a ceramic heater in which the heating resistor is buried inside the ceramic member. If necessary, an insulating material formed of silicon nitride, alumina and the like, and a buffer material formed of graphite and the like may be disposed on the concave circular-arc face of the ceramic heater in a layered state.

The plurality of ceramic heaters obtained in this way are disposed adjacently in the circumferential direction of the outer circumferential face of the honeycomb substrate so as to surround the outer circumferential face and the concave circular-arc face of each ceramic heater is caused to come into face-contact with the outer circumferential face of the honeycomb substrate. Subsequently, a ceramic fiber mat (a heat insulating material) is wound on the outer circumference of the honeycomb substrate including the heater and a retainer ring is disposed so as to be close to both end faces of the honeycomb substrate. Then, these components are nipped by two members each having a semi-circular curved portion forming a canning case having a clamshell structure and the two members are coupled so as to accommodate these components inside the canning case.

With the above-described configuration, the honeycomb type heating device of the invention which can be installed in the exhaust gas emitting path for the exhaust gas emitted from the engine is obtained.

(3) Honeycomb Type Heating Device Using Method:

The honeycomb type heating device used in the method of using the honeycomb type heating device of the invention is the honeycomb type heating device of the invention. That is, in the using method, the honeycomb type heating device 1 including the honeycomb substrate 2 and the plurality of heaters 9 are used as shown in FIGS. 1 to 3. In the honeycomb type heating device 1, the honeycomb substrate 2 has a pillar shape and includes the porous partition wall 4 which defines the plurality of cells 5 extending from one end face to the other end face and the circumferential wall 3 which surrounds the partition wall 4. The cell 5 is used as a flow channel for a fluid such as an exhaust gas. The plurality of heaters 9 are disposed adjacently on the outer circumferential face 8 in the circumferential direction of the outer circumferential face 8 as an outer face (a face exposed to the outside) of the circumferential wall 3 of the honeycomb substrate 2. Each heater 9 is a resistance heating heater that radiates heat by a current supplied thereto. The exhaust gas purifying catalyst is loaded on the honeycomb substrate 2. Then, in the honeycomb type heating device 1, the heater installation area ratio is 50 to 100%. Further, the honeycomb type heating device 1 has been described in detail as above.

In the method of using the honeycomb type heating device of the invention, the honeycomb type heating device 1 is installed in the exhaust gas emitting path for the exhaust gas emitted from the engine. Then, a current starts to be supplied to each heater 9 before the start-up of the engine so as to radiate heat from each heater 9, and the temperature of the honeycomb substrate 2 having the exhaust gas purifying catalyst loaded thereon is increased to the catalyst activating temperature or more.

By the method of using the honeycomb type heating device of the invention, it is possible to highly efficiently purify a toxic element contained in the exhaust gas by the catalyst activated immediately after the start-up of the engine.

EXAMPLES

Hereinafter, the invention will be described in more detail based on examples, but the invention is not limited to these examples.

Example 1

A binder and water were added to SiC powder so as to make a molding raw material for a honeycomb substrate, and the molding raw material was kneaded by a vacuum pugmill so as to obtain round pillar-shaped clay. The clay was extruded so as to obtain a round pillar-shaped honeycomb formed body including a partition wall defining a plurality of cells extending from one end face to the other end face and a circumferential wall surrounding the partition wall. Subsequently, the honeycomb formed body was dried by micro waves and hot air so as to obtain a honeycomb dried body. Subsequently, billet-shaped metallic Si was placed on the honeycomb dried body and was fired at a high temperature in a vacuum furnace so as to obtain a honeycomb substrate formed of Si—SiC composite. The honeycomb substrate obtained in this way had a round pillar shape with a diameter of 90 mm and a length of 75 mm. Here, the area of the outer circumferential face was 21195 mm$^2$, the thickness of the circumferential wall was 0.3 mm, the thickness of the partition wall was 0.15 mm, the cell shape was square, and the cell density was 400 cells/cm$^2$. Further, the porosity of the honeycomb substrate was 5%.

Next, a binder and water were added to $Si_3N_4$ powder so as to make a molding raw material for a heater. A plate formed body was made from the molding raw material for the heater so as to be curved similarly to the outer circumferential face of the honeycomb substrate and was fired at a high temperature so as to make a ceramic plate formed of $Si_3N_4$. After a heating resistor formed of platinum was printed on the ceramic plate, the ceramic plate was fired at a high temperature again. Then, the ceramic plate formed of $Si_3N_4$ was laminated and bonded on the heating resistor so as to obtain a resistance heating heater (a ceramic heater) having a concave circular-arc face. The concave circular-arc face of the heater was formed so that the width (the length of the circular-arc portion) was 10 mm and the length (the length in a direction perpendicular to the circular-arc portion) was 65 mm.

Subsequently, twenty heaters obtained as described above were adjacently disposed on the outer circumferential face in the circumferential direction of the outer circumferential face of the honeycomb substrate and the concave circular-arc face of each heater was caused to come into face-contact with the outer circumferential face of the honeycomb substrate. At this time, the arrangement of the heaters was adjusted so that the gap between the adjacent heaters is the same in the circumferential direction of the outer circumferential face of the honeycomb substrate. The center angle of each heater was 13°. Subsequently, a ceramic fiber mat (a heat insulating material) was wound on the outer circumference of the honeycomb substrate including the heater and the retainer ring was disposed so as to be close to both end faces of the honeycomb substrate. Then, these components were nipped by two members each having a semi-circular curved portion forming the canning case having a clamshell structure and the two members were coupled so as to accommodate these components inside the canning case. The heater installation area ratio of the honeycomb type heating device obtained in this way was 61.3%.

(Evaluation)

The heaters of the obtained honeycomb type heating device were connected in series and a current was supplied to the heaters so that the input heat amount became 160 kJ. Then, at the center portion in the longitudinal direction (the axial direction) of the honeycomb substrate heated by the heat radiated from the heater by the current supplied thereto, the temperature was measured at a portion near the circumferential wall and the axis portion. Then, the average temperature was calculated and the value was illustrated as the "substrate average temperature" in Table 1. Further, the performance of the honeycomb type heating device was evaluated based on the "substrate average temperature", and the result was illustrated in the same table. The evaluation was made so that a "success mark" was given when the "substrate average temperature" was 200° C. or more and a "failure mark" was given when the "substrate average temperature" was lower than 200° C.

Examples 2 to 19 and Comparative Examples 1 to 11

The honeycomb type heating devices of Examples 2 to 19 and Comparative Examples 1 to 11 were obtained similarly to Example 1 except that the heater installation area ratio was illustrated in the same table while the width and the length of the concave circular-arc face of the heater and the center angle and the number of the heater were changed as illustrated in Table 1 and Table 2. In the honeycomb type heating devices of Examples 2 to 19 and Comparative Examples 1 to 11, the "substrate average temperature" was calculated similarly to the honeycomb type heating device of Example 1 and the performance of the honeycomb type heating device was evaluated. These results were illustrated in Table 1.

TABLE 1

| | Honeycomb substrate | | | Heater | | | | | Heater | Substrate | |
|---|---|---|---|---|---|---|---|---|---|---|---|
| | Diameter (mm) | Length (mm) | Area of outer circumferential face (mm²) | Center angle *1 (°) | Width *2 (mm) | Length *3 (mm) | Installation number (unit) | Installation area *4 (mm²) | installation area ratio (%) | average temperature (° C.) | Evaluation |
| Comparative Example 1 | 90 | 75 | 21195 | 13 | 10 | 65 | 16 | 10400 | 49.1 | 195 | Failure |
| Example 1 | 90 | 75 | 21195 | 13 | 10 | 65 | 20 | 13000 | 61.3 | 260 | Success |
| Example 2 | 90 | 75 | 21195 | 13 | 10 | 65 | 24 | 15600 | 73.6 | 340 | Success |
| Comparative Example 2 | 90 | 75 | 21195 | 25 | 20 | 65 | 8 | 10400 | 49.1 | 187 | Failure |
| Example 3 | 90 | 75 | 21195 | 25 | 20 | 65 | 10 | 13000 | 61.3 | 251 | Success |
| Example 4 | 90 | 75 | 21195 | 25 | 20 | 65 | 12 | 15600 | 73.6 | 325 | Success |
| Comparative Example 3 | 90 | 75 | 21195 | 38 | 30 | 65 | 5 | 9750 | 46.0 | 190 | Failure |
| Example 5 | 90 | 75 | 21195 | 38 | 30 | 65 | 6 | 11700 | 55.2 | 235 | Success |
| Example 6 | 90 | 75 | 21195 | 38 | 30 | 65 | 7 | 13650 | 64.4 | 260 | Success |
| Example 7 | 90 | 75 | 21195 | 38 | 30 | 65 | 8 | 15600 | 73.6 | 310 | Success |
| Example 8 | 90 | 75 | 21195 | 38 | 30 | 65 | 9 | 17550 | 82.8 | 350 | Success |
| Example 9 | 90 | 75 | 21195 | 38 | 30 | 75 | 9 | 20250 | 95.5 | 360 | Success |
| Comparative Example 4 | 90 | 75 | 21195 | 51 | 40 | 65 | 4 | 10400 | 49.1 | 180 | Failure |
| Example 10 | 90 | 75 | 21195 | 51 | 40 | 65 | 5 | 13000 | 61.3 | 245 | Success |
| Example 11 | 90 | 75 | 21195 | 51 | 40 | 65 | 6 | 15600 | 73.6 | 297 | Success |

*1, *2, *3: Value per one heater.
*4: Total value of all heaters.

TABLE 2

|  | Honeycomb substrate | | Area of outer circumferential face (mm²) | Heater | | | | | Heater installation area ratio (%) | Substrate average temperature (°C.) | Evaluation |
|---|---|---|---|---|---|---|---|---|---|---|---|
|  | Diameter (mm) | Length (mm) |  | Center angle *1 (°) | Width *2 (mm) | Length *3 (mm) | Installation number (unit) | Installation area *4 (mm²) |  |  |  |
| Comparative Example 5 | 90 | 75 | 21195 | 76 | 60 | 65 | 2 | 7800 | 36.8 | 180 | Failure |
| Example 12 | 90 | 75 | 21195 | 76 | 60 | 65 | 3 | 11700 | 55.2 | 220 | Success |
| Example 13 | 90 | 75 | 21195 | 76 | 60 | 65 | 4 | 15600 | 73.6 | 276 | Success |
| Comparative Example 6 | 90 | 75 | 21195 | 102 | 80 | 65 | 2 | 10400 | 49.1 | 161 | Failure |
| Example 14 | 90 | 75 | 21195 | 102 | 80 | 65 | 3 | 15600 | 73.6 | 250 | Success |
| Example 15 | 90 | 75 | 21195 | 153 | 120 | 65 | 2 | 15600 | 73.6 | 220 | Success |
| Comparative Example 7 | 90 | 75 | 21195 | 178 | 140 | 65 | 1 | 9100 | 42.9 | 130 | Failure |
| Example 16 | 90 | 75 | 21195 | 178 | 140 | 65 | 2 | 18200 | 85.9 | 240 | Success |
| Comparative Example 8 | 90 | 75 | 21195 | 229 | 180 | 65 | 1 | 11700 | 55.2 | 143 | Failure |
| Comparative Example 9 | 90 | 75 | 21195 | 318 | 250 | 65 | 1 | 16250 | 76.7 | 189 | Failure |
| Comparative Example 10 | 90 | 75 | 21195 | 344 | 270 | 65 | 1 | 17550 | 82.8 | 193 | Failure |
| Comparative Example 11 | 90 | 75 | 21195 | 38 | 30 | 40 | 8 | 9600 | 45.3 | 187 | Failure |
| Example 17 | 90 | 75 | 21195 | 38 | 30 | 45 | 8 | 10800 | 51.0 | 257 | Success |
| Example 18 | 90 | 75 | 21195 | 38 | 30 | 50 | 8 | 12000 | 56.6 | 276 | Success |
| Example 19 | 90 | 75 | 21195 | 38 | 30 | 65 | 8 | 15600 | 73.6 | 330 | Success |

*1, *2, *3: Value per one heater.
*4: Total value of all heaters.

(Observation)

As illustrated in Table 1, in the honeycomb type heating devices of Examples 1 to 19 in which the heater installation area ratio was 50 to 100%, the "substrate average temperature" was 200° C. or more and the evaluation was a "success". Meanwhile, in the honeycomb type heating devices of Comparative Examples 1 to 7 and 11 in which the heater installation area ratio was smaller than 50%, the "substrate average temperature" was lower than 200° C. and the evaluation was a "failure". Furthermore, in the honeycomb type heating devices of Comparative Examples 8 to 10, the heater installation area ratio was 50 to 100%, the "substrate average temperature" was lower than 200° C., and the evaluation was a "failure". This originated from the fact that only one heater was used in the honeycomb type heating devices of Comparative Examples 8 to 10, and the concave circular-arc face of the single heater was not formed with high precision so as to come into face-contact with the outer circumferential face of the honeycomb substrate in a wide range. That is, although the heater installation area ratio was high in the honeycomb type heating devices of Comparative Examples 8 to 10, the range of the portion in which the outer circumferential face of the honeycomb substrate actually came into face-contact with the concave circular-arc face of the heater was narrow, and the heat of the heater was not transferred to the entire honeycomb substrate with high efficiency, The invention can be appropriately used as a honeycomb type heating device and a honeycomb type heating device using method. Here, the honeycomb type heating device is installed in an exhaust gas emitting path for an exhaust gas emitted from an engine of an automobile or the like and a temperature of an exhaust gas purifying catalyst is increased to an active temperature at an early timing.

DESCRIPTION OF REFERENCE NUMERALS

1: honeycomb type heating device, 2: honeycomb substrate, 3: circumferential wall, 4: partition wall, 5: cell, 6: one end face, 7: other end face, 8: outer circumferential face, 9: heater, 10: concave circular-arc face (face contacting outer circumferential face in honeycomb substrate), 11: electrode terminal protrusion, 12: slit, 13: insulating material, 14: buffer material, 15: canning case, 16: retainer ring, 17: heat insulating material, 18: hole, 19: hole, 20: space, O: center, α: center angle

What is claimed is:

1. A honeycomb type heating device comprising:
   a pillar-shaped honeycomb substrate which includes a porous partition wall defining a plurality of cells extending from one end face to the other end face and a circumferential wall surrounding the partition wall; and
   a plurality of heaters which are disposed adjacently in a circumferential direction of an outer circumferential face that is an outer surface of the circumferential wall, on the outer circumferential face,
   wherein each heater is a resistance heating heater which radiates heat by a current supplied thereto,
   each heater comes into face-contact with the outer circumferential face, and
   a ratio of a total area of a portion covered by the heaters of the outer circumferential face with respect to the entire area of the outer circumferential face is 50 to 100%.

2. The honeycomb type heating device according to claim 1,
   wherein the honeycomb substrate is formed of a ceramic material having thermal conductivity of 20 W/m·K or more.

3. The honeycomb type heating device according to claim 1,
   wherein the plurality of heaters are electrically connected in series or in parallel and have electric resistances which withstand application of a high voltage of 200 V or more.

4. The honeycomb type heating device according to claim 1,
wherein each heater has an insulating function of preventing a current from flowing from each heater to the honeycomb substrate.

5. The honeycomb type heating device according to claim 1,
wherein a center angle of each heater disposed on the outer circumferential face of the honeycomb substrate is 180° or less in a cross-section perpendicular to the longitudinal direction of the honeycomb substrate.

6. The honeycomb type heating device according to claim 1,
wherein the thickness of the circumferential wall is larger than that of the partition wall.

7. The honeycomb type heating device according to claim 1,
wherein the honeycomb substrate is provided with a stress relief.

8. The honeycomb type heating device according to claim 1,
wherein a buffer material is disposed on a face of each heater contacting the outer circumferential face.

9. The honeycomb type heating device according to claim 1, further comprising:
a tubular canning case,
wherein the honeycomb substrate is accommodated inside the canning case.

10. The honeycomb type heating device according to claim 9,
wherein a retainer ring is disposed inside the canning case so as to be close to both end faces of the honeycomb substrate and the retainer ring prevents a fluid from flowing into a space defined by the canning case, the honeycomb substrate, and the retainer ring.

11. The honeycomb type heating device according to claim 9,
wherein a heat insulating material is disposed between each heater and the canning case.

12. The honeycomb type heating device according to claim 1,
wherein an exhaust gas purifying catalyst is loaded on the honeycomb substrate.

13. The honeycomb type heating device according to claim 12,
wherein the honeycomb type heating device is installed in an exhaust gas emitting path for an exhaust gas emitted from an engine, and used so that a current begins being supplied to each heater before start-up of the engine to heat each heater and increase a temperature of the honeycomb substrate loading exhaust gas purifying catalyst thereon to a temperature equal to or more than a catalyst activating temperature of the catalyst.

14. A method of using a honeycomb type heating device including a pillar-shaped honeycomb substrate which includes a porous partition wall defining a plurality of cells extending from one end face to the other end face and a circumferential wall surrounding the partition wall; and a plurality of heaters which are disposed adjacently in a circumferential direction of an outer circumferential face that is an outer surface of the circumferential wall, on the outer circumferential face, wherein each heater is a resistance heating heater which radiates heat by a current supplied thereto, each heater comes into face-contact with the outer circumferential face, and a ratio of a total area of a portion covered by the heaters of the outer circumferential face with respect to the entire area of the outer circumferential face is 50 to 100%, comprising
installing the honeycomb type heating device having an exhaust gas purifying catalyst loaded on a honeycomb substrate in an exhaust gas emitting path for an exhaust gas emitted from an engine, and
beginning supplying a current to each heater before start-up of the engine to heat each heater and increase a temperature of the honeycomb substrate loading exhaust gas purifying catalyst thereon to a temperature equal to or more than a catalyst activating temperature of the catalyst.

\* \* \* \* \*